United States Patent
Sparks et al.

[11] Patent Number: 5,932,809
[45] Date of Patent: Aug. 3, 1999

[54] SENSOR WITH SILICON STRAIN GAGE

[75] Inventors: Douglas Ray Sparks; Mark Billings Kearney, both of Kokomo, Ind.

[73] Assignee: Delco Electronics Corporation, Kokomo, Ind.

[21] Appl. No.: 09/024,379

[22] Filed: Feb. 17, 1998

[51] Int. Cl.[6] .............................. G01L 9/04; G01L 9/06
[52] U.S. Cl. ............................................ 73/727; 73/726
[58] Field of Search .................... 73/726, 727; 338/42

[56] References Cited

U.S. PATENT DOCUMENTS 3,341,794  9/1967  Stedman .............................. 338/42 X
5,629,486  5/1997  Viduya et al. ............................ 73/727

*Primary Examiner*—Joseph L. Felber
*Attorney, Agent, or Firm*—Jimmy L. Funke

[57] ABSTRACT

A media-compatible sensing structure (210) that employs strain-sensing elements (222) formed in or on a silicon chip (212). The sensor (210) generally includes a metal body (214) having a diaphragm (216) and an edge (226) formed by an abrupt change in the thickness of the metal body (214) in a direction normal to the diaphragm (216). The silicon chip (212) is secured directly to the metal diaphragm (216) and has at least one strain-sensing element (222) aligned with the edge (226) of the body (214) in the direction normal to the diaphragm (216), such that movement of the diaphragm (216) induces strain in the silicon chip (212) that is localized at the strain-sensing element (222). The chip (212) preferably includes a groove (234) in its surface (212) facing the diaphragm (216) and between the strain-sensing element (222) and the metal body (214), such that strain induced in the chip (212) by movement of the diaphragm (216) is further concentrated in the region of the chip (212) containing the strain-sensing element (222). The chip (212) is preferably attached to the metal diaphragm (216) with a bonding material (236). To promote adhesion of the chip (212) to the diaphragm (216), the chip (212) preferably has recesses (240) in its surface facing the diaphragm (216) to create an interlocking effect between the bonding material (236) and the chip (212).

20 Claims, 2 Drawing Sheets

SENSOR WITH SILICON STRAIN GAGE

FIELD OF THE INVENTION

The present invention generally relates to sensing devices and methods for their production. More particularly, this invention relates to a media-compatible sensor assembly that combines a corrosion-resistant diaphragm and strain-sensing elements on a silicon chip attached to the diaphragm to yield a sensor capable of accurately sensing very high pressures, loads or strains while being chemically and mechanically robust and readily manufactured.

BACKGROUND OF THE INVENTION

There is a continuous effort to develop pressure sensors that are lower in cost and smaller in size, yet are characterized by high reliability, sensitivity and linearity. Sensors finding wide acceptance on the basis of furthering these characteristics include those that utilize semiconductor materials with a micro machined sensing diaphragm, a notable example being micro machined single-crystal silicon pressure transducer cells manufactured using semiconductor fabrication processes. In the processing of such cells, a thin diaphragm is formed in a silicon wafer through preferential chemical etching. Ion implantation and diffusion techniques are then used to drive doping elements into the diaphragm, forming piezoresistive elements whose electrical conductivity changes with strain such that deflection of the diaphragm causes a change in resistance value of the piezoresistive elements, which can then be correlated to the magnitude of the pressure applied to the diaphragm.

Diaphragms of single-crystal silicon pressure transducer cells are typically small, rarely exceeding a few millimeters in width, and are very thin, with a thickness of often less than 100 micrometers. The use of standard single-crystal silicon wafers and standard semiconductor device fabrication processes allows many such cells to be fabricated from a single wafer, providing some economy of scale. However, silicon is susceptible to chemical attack and erosion by various media, particularly in applications where a high-pressure medium is to be sensed, e.g., automotive applications that involve sensing brake fluid, oil, coolant, transmission fluid, hydraulic fluid, fuel and steering fluid pressures at pressures of two atmospheres or more. For such applications, a pressure sensor must also be physically rugged and resistant to the hostile environment of the sensed medium, necessitating that a micro machined silicon pressure transducer cell include some form of protection in order to realize its advantageous operational characteristics in the chemically hostile environment.

Current methods for producing media-compatible, high-pressure sensors include enclosing a silicon sensing chip in an inert fluid, such as a silicone oil or gel, and then further separating the sensing chip from the medium to be sensed with a metal diaphragm, such that pressure must be transmitted through the metal diaphragm and fluid to the sensing chip. While achieving some of the operational advantages of silicon pressure transducer cells, the manufacturing processes for these sensors, and hence the sensors themselves, are relatively expensive and complicated. As a result, these sensors are not suitable as mass-produced sensors for automotive applications. Furthermore, the influence of the fluid in contact with the silicon pressure transducer cell over the operating temperature range and over time is of sufficient magnitude to require complex electronics to separate their effect on the silicon pressure transducer cell from the effect of pressure.

An alternative approach is to form a capacitor plate on a ceramic diaphragm, which is then bonded to a base with a second capacitor plate. The use of a chemically-resistant and mechanically-tough ceramic materials, such as aluminum oxide or zirconium oxide, allows the diaphragm to directly contact the medium whose pressure is to be measured, thereby eliminating the requirement for protective packaging. As the ceramic diaphragm deflects under the influence of pressure, the gap between the capacitor plates changes, causing a corresponding change in capacitance that can be correlated to the applied pressure. However, the circuit required to detect capacitance changes is somewhat complex and subject to noise corruption. In addition, attaining an adequate seal between the ceramic diaphragm and base for high pressure applications can be difficult.

Yet another approach employing a chemically-resistant ceramic diaphragm uses thick-film piezoresistors that are screen printed on the diaphragm, thereby providing for pressure sensing in the same manner as described above for single-crystal silicon pressure transducer cells. As with ceramic capacitive pressure sensors, the ceramic material is chosen to allow direct contact with the medium whose pressure is to be sensed, eliminating the need for protective packaging. While the signal detection circuitry used is less complicated than that for the capacitive sensor, the difficulty of reliably sealing the ceramic diaphragm with a base is the same as that for the capacitive sensors in high-pressure applications.

Finally, another media-compatible sensor known in the prior art employs a metal diaphragm as the sensing element. Because metal diaphragms generally deflect more for a given thickness and pressure than ceramic diaphragms, which exhibit lower elongations before breaking and are therefore designed to deflect less under pressure, sensing is performed by thin-film polysilicon or metal deposited on a steel diaphragm. The metal diaphragm must first be coated with a dielectric layer to electrically isolate the diaphragm from the thin-film resistors and conductors. A thin-film polysilicon layer is then deposited to form the piezoresistors, followed by thin-film metallization to provide electrical interconnects. As is conventional, the thin-film layers are typically deposited by such processes as chemical or physical vapor deposition. The equipment necessary for these processes is expensive, and deposition rates are extremely slow. Deposition of the thin-film layers requires multiple patterning, exposure, developing and stripping steps for the required thin-film photoresist and metallization, and must be carried out in a controlled environment to assure that no air borne particles are present on the surface to be coated. In addition, such processes typically deposit thin-films no thicker than about 10,000 angstroms, necessitating that the surface of the metal diaphragm be extremely smooth to avoid rough surface features penetrating through or producing discontinuities in the deposited thin films. Finally, the resistance of the resulting polysilicon thin-film piezoresistors can vary dramatically with deposition temperature.

While achieving some of the operational advantages of silicon pressure transducer cells, it is apparent that the above sensors and/or their manufacturing processes have significant drawbacks, including complicated manufacturing processes that render the sensors incompatible with mass-production applications. In addition, because of the difficulty of sealing a ceramic sensing element to a ceramic base, the above-noted ceramic pressure transducer cells are generally not suitable for applications in which pressures exceed about 1000 psi (about 7 MPa).

Accordingly, there is a need for a pressure sensor that is compatible with corrosive, high-pressure media, yet is relatively uncomplicated, low in cost, and characterized by high reliability and sensitivity.

SUMMARY OF THE INVENTION

It is an object of this invention to provide a sensing structure that combines the media compatibility of metal diaphragms with the high sensitivity of strain-sensing elements of the type formed in a silicon chip.

It is another object of this invention to provide a sensor having a corrosion-resistant metal diaphragm that is compatible with a wide variety of corrosive media.

It is yet another object of this invention that the sensor employs a silicon chip attached to the metal diaphragm, with piezoresistive elements formed in the surface of the silicon chip or in a thin polysilicon film applied to the silicon chip.

In accordance with a preferred embodiment of this invention, these and other objects and advantages are accomplished as follows.

The present invention provides a media-compatible sensing structure that employs strain-sensing elements formed in or on a silicon chip, yielding a sensor capable of accurately sensing very high pressures, loads or strains. The sensor of this invention generally includes a metal body having a diaphragm and an edge formed by an abrupt change in the thickness of the metal body in a direction normal to the diaphragm. The edge thereby defines a boundary of the diaphragm with respect to the remainder of the metal body. For purposes of compatibility with a wide variety of media, the metal body is preferably formed of a steel, most preferably a stainless steel. The diaphragm can be formed by stamping, etching or machining.

A silicon chip is secured directly to the metal diaphragm. The chip has at least one strain-sensing element aligned with the edge of the body in the direction normal to the diaphragm, such that movement of the diaphragm induces strain in the silicon chip that is localized at the strain-sensing element. According to the invention, the chip is preferably formed of single-crystal silicon and the strain-sensing element may be a piezoresistor formed by a doped surface region of the chip, or formed by a thin-film piezoresistive element on the silicon chip. The silicon chip preferably includes an optional groove in the surface of the chip facing the diaphragm and between the strain-sensing element and the metal body, such that strain induced in the silicon chip by movement of the diaphragm is further concentrated in the region of the chip containing the strain-sensing element.

The silicon chip is preferably attached to the metal diaphragm with a suitable bonding material, such as an adhesive, solder or glass. To promote adhesion of the chip to the diaphragm, the chip preferably has a plurality of recesses in its surface facing the diaphragm. The bonding material extends at least partially into the recesses in the surface of the chip, creating an interlocking effect between the bonding material and the chip.

The above-described sensor can be manufactured by separately fabricating the diaphragm and silicon chip, with the attachment of the chip to the diaphragm being a final step. Preferably, the silicon chip is mounted to the diaphragm opposite the surface of the diaphragm contacting the medium being sensed, so that the silicon chip is not subject to attack by the medium. Further packaging of the sensor can include covers and electrical connections known in the art. In addition, the pressure sensor assembly of this invention preferably includes signal conditioning circuitry that is electrically interconnected with the sensing element. The signal conditioning circuitry may be integrated with the strain-sensing elements on the silicon chip.

According to this invention, the above structures and processes yield a pressure sensor that combines the advantages of a corrosion-resistant metal diaphragm with the sensitivity of silicon strain-sensing elements. Sensors of this invention are capable of sensing very high pressures, e.g., up to at least 4000 atmospheres, while being chemically and mechanically robust and readily manufactured. In addition, the sensors are readily integrated with signal conditioning circuitry that compensates the output of the sensing elements for temperature and may further serve to amplify the output. Notably, the pressure sensor is not encumbered by the enclosures and packaging requirements for silicon sensors of the prior art. In addition to being capable of sensing very high pressures, the metal diaphragm can also be readily fabricated to tailor the performance characteristics of the sensor.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
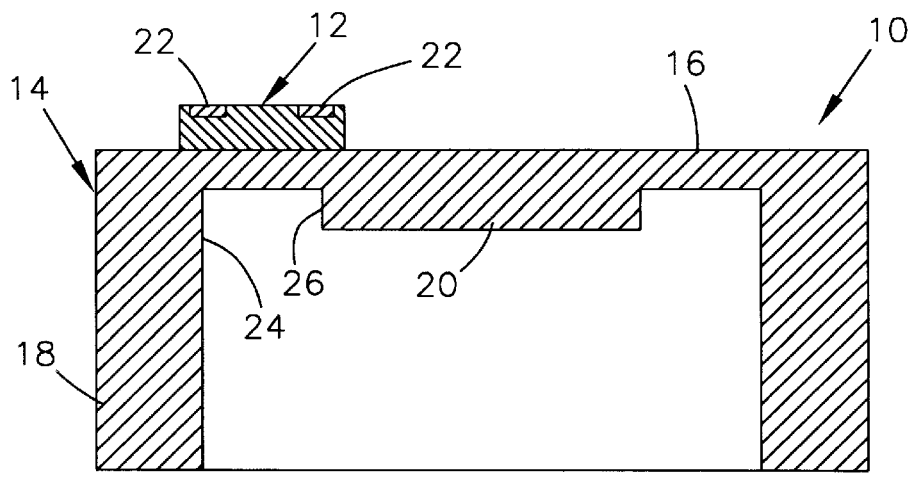
FIGS. 1 and 2 are cross-sectional and plan views, respectively, of a pressure sensor assembly equipped with strain-sensing elements on a silicon chip in accordance with a first embodiment of this invention.
Figure 2:
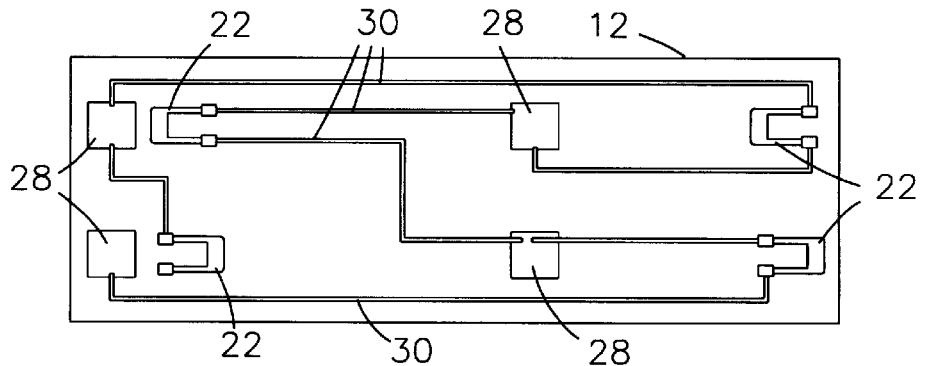

FIGS. 1 and 2 represent a pressure sensor assembly 10 that includes a silicon sensing chip 12 mounted to a metal body 14 in accordance with a first embodiment of the present invention. As illustrated, the metal body 14 includes a diaphragm 16 on which the chip 12 is mounted, a rim 18 that supports the diaphragm 16 at its periphery, and a boss 20 centrally located on the diaphragm 16. The chip 12 is shown as having four strain-sensing elements 22 that are capable of sensing strain in the diaphragm 16 induced when the diaphragm 16 deflects in response to a pressure or force applied by a medium to the lower surface (as viewed in FIG. 1) of the diaphragm 16.

According to known engineering principles, the diameter and thickness of the diaphragm 16 are relatively sized to ensure that the diaphragm 16 is sufficiently flexible to respond to changes in pressure in the medium, while the rim 18 provides a structurally rigid support for the diaphragm 16. Stainless steel is preferred for the metal body 14 in order to achieve a suitable level of corrosion resistance to the given medium. Various grades of steel could be used, including AISI Type 300 and 400 Series alloys, though it is within the scope of this invention to use other stainless steels, as well as carbon and galvanized steels, KOVAR, Alloy-42, molybdenum alloys, titanium alloys, and other metals.

The configuration of the sensor assembly 10 shown in FIG. 1 is for illustrative purposes, in that it is foreseeable that the metal body 14 could be configured differently from that shown to achieve the same desired result. Furthermore, while the invention will be discussed primarily with reference to sensing pressure, those skilled in the art will recognize that the invention is applicable to any situation in which the deflection of a diaphragm is desired to be sensed, as where force or displacement is to be detected.

As shown in FIG. 1, the strain-sensing elements 22 are aligned with edges 24 and 26 defined in the metal body 14 between the diaphragm 16 and the rim 18 and boss 20. In effect, the edges 24 and 26 are the result of abrupt changes in the thickness of the metal body 14 in a region of the metal body 14 contiguous with the diaphragm 16. According to the invention, locating the strain-sensing elements 22 directly above the edges 24 and 26 causes strains induced by the deflection of the diaphragm 16 to be localized in the chip 12 at the strain-sensing elements 22, thereby promoting the sensitivity of the sensor assembly 10. The boss 20 is not a required structure of this invention if strain sensing is limited to the edge 24 between the diaphragm 16 and rim 18. Other than placement over one of the edges 24 and 26, the number and position of the piezo resistors 22 can be varied on the chip 12.

In a preferred embodiment, the chip 12 is permanently attached to the metal body 14 by such bonding materials as solder, glass, and adhesives such as epoxies. To be compatible with soldering, the surface of the chip 12 opposite the strain-sensing elements 22 must have a backside metal film which is solderable, as must be the metal of which the metal body 14 is formed. If an adhesive or glass is used, adhesion between the chip 12 and metal body 14 is preferably promoted in accordance with the embodiment of FIGS. 5 and 6, discussed below. Because the metal body 14 separates the chip 12 from the sensed medium, neither the silicon chip 12 nor the bonding material is required to be resistant to the medium. FIG. 2 shows a suitable layout for the strain-sensing elements 22 on the silicon chip 12. Four strain-sensing elements 22 are illustrated as being interconnected with bond pads 28 and metal traces 30 to yield a Wheatstone bridge for processing the output of the strain-sensing elements 22. The layout shown in FIG. 2 can be produced by semiconductor device fabrication and thin-film processes. As is conventional, the former approach requires the silicon chip 12 to be single-crystal silicon and entails ion implantation and diffusion techniques to drive doping elements into the chip 12, forming piezoresistive elements whose electrical conductivity changes with strain. Thin-film processes suitable for this invention conventionally entail thin-film polysilicon piezoresistors formed on at least one dielectric layer that electrically insulates the piezoresistors from the diaphragm 16. Generally, piezoresistors formed in single-crystal silicon by doping and diffusion are preferred in order to promote sensitivity, though thin-film piezoresistors on single-crystal silicon may be preferred in high temperature applications, e.g., where service temperatures of 125° C. and higher are anticipated. The sensitivity of the strain-sensing elements 22 can be further promoted by using a relatively thin chip 12, e.g., a thickness of about 100 μm or less. The chip 12 can be thinned by conventional methods, such as forming an etch stop in the surface of the silicon chip 12 opposite the elements 22 with a P+ diffused region or a doped epitaxial layer, or mechanical grinding.

Figure 3:
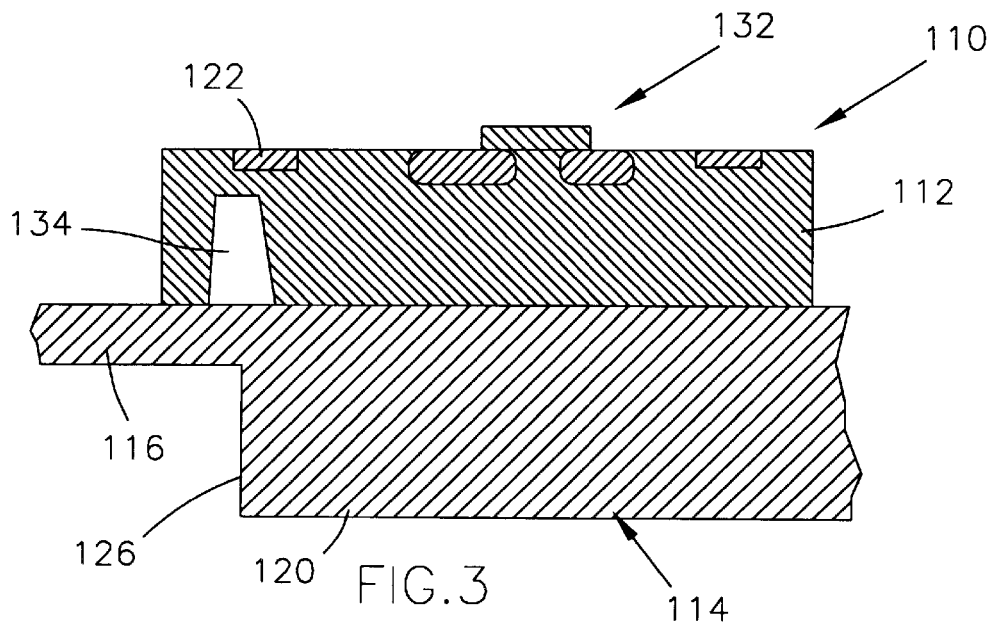
FIGS. 3 and 4 are cross-sectional and plan views, respectively, of a pressure sensor assembly equipped with strain-sensing elements on a silicon chip in accordance with a second embodiment of this invention.
Figure 4:
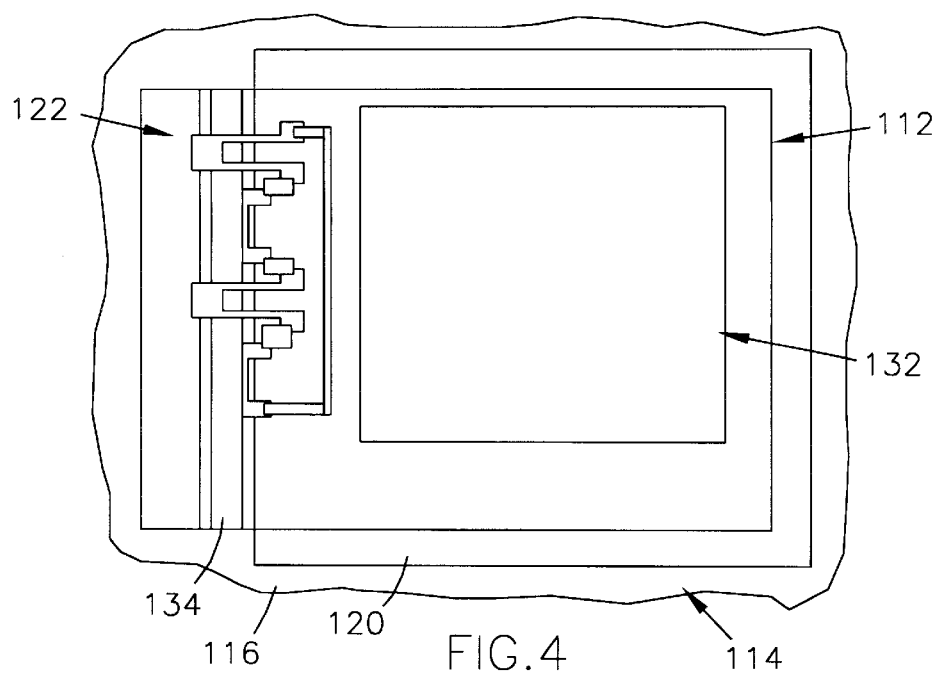

Shown in FIGS. 3 and 4 is a sensor assembly 110 in accordance with a second embodiment of this invention, in which the silicon chip 112 further includes a groove 134 between strain-sensing elements 122 and an edge 126 of the metal body 114 (the edge 126 being shown as that defined between the diaphragm 116 and boss 120). The groove 134 is preferably micro machined in the surface of the chip 112 opposite the strain-sensing elements 122 by known silicon etching methods. As shown, the groove 134 is linear and substantially parallel to the edge of the chip 112 aligned over the edge 126 of the metal body 114. According to the invention, the groove 134 serves to concentrate the strains induced in the chip 112 by deflection of the diaphragm 116 in the region of the chip 112 containing the elements 122. The groove 134 preferably extends into the chip 112 at least 50% of the chip thickness in order to promote the desired strain-localizing effect. While the walls of the groove 134 are shown as being tapered, it is foreseeable that different etching techniques could yield grooves 134 with different cross-sectional shapes. Also, by placing the chip 112 over the edge 24 (as shown in FIG. 1) instead of the edge 126 (as shown in FIG. 3), the groove 134 can be eliminated.

Also shown in FIG. 3 is the inclusion of signal conditioning circuitry 132 on the chip 12. The chip 12 is again preferably single-crystal silicon, with the signal conditioning circuitry, such as CMOS, BICMOS or bipolar integrated circuit technology, providing compensation for output errors produced as a result of temperature effects and extraneous mounting stresses. Amplification of the output signal can also be performed on-chip. FIG. 4 illustrates how a Wheatstone bridge can be laid out in the surface of the chip 12 with respect to the signal conditioning circuitry 132 and the groove 134.

Figure 5:
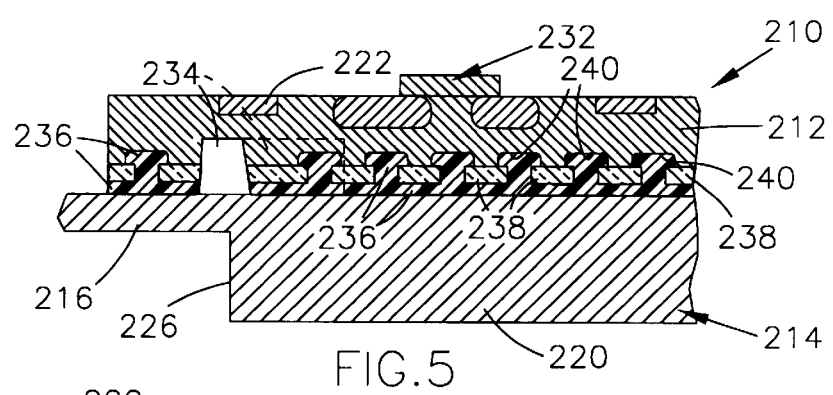
FIGS. 5 and 6 are cross-sectional and plan views, respectively, of a pressure sensor assembly equipped with strain-sensing elements on a silicon chip in accordance with a third embodiment of this invention.
Figure 6:
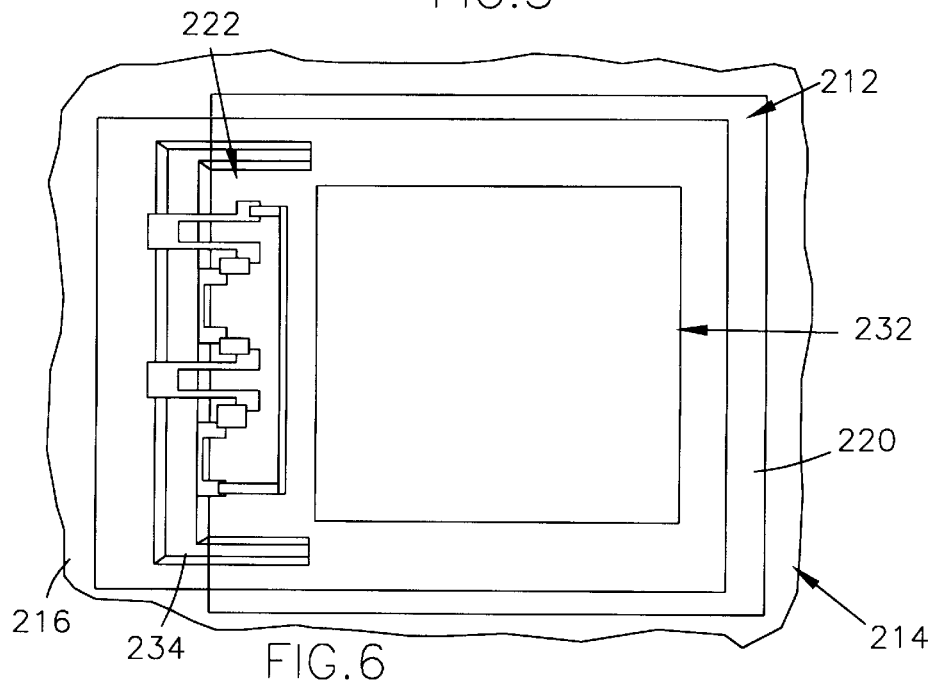

FIGS. 5 and 6 show yet another embodiment of a sensor assembly 210 in accordance with the invention. As with the embodiment of FIGS. 3 and 4, the sensor assembly 210 includes a silicon chip 212 mounted to a metal body 214 that includes a diaphragm 216, a boss 220, and an edge 226 defined between the diaphragm 216 and boss 220. Formed in the silicon chip 212 are strain-sensing elements 222 and signal conditioning circuitry 232. The sensor assembly 210 primarily differs from that of FIGS. 3 and 4 by having a U-shaped groove 234 when viewed as shown in FIG. 6. The groove 234 of this embodiment has been determined to allow for greater sensitivity to stress than the straight groove 134 of FIG. 4. Furthermore, the U-shaped groove 234 promotes die handling during fabrication and processing of the chip 212 because the groove 234 does not extend across the entire width of the chip 212, such that the chip 212 is less susceptible to breakage during handling.

As shown in FIG. 5, the chip 212 is permanently attached to the metal body 214 with an adhesive or glass bonding material 236. To promote adhesion, the lower surface of the chip 212 is shown as having an array of holes or recesses 240 into which the bonding material 236 flows when the chip 212 is mounted to the metal body 214. The recesses 240 can be formed by any suitable micromachining techniques. In a preferred embodiment, the recesses 240 are formed by wet or dry plasma etching through an oxide layer 238 on the lower surface of the chip 212 so as produce oxide undercuts as shown. The undercuts serve to trap the bond material 236 within the recesses 240, thereby interlocking the chip 212 with the metal body 214 and promoting transmission of the deflection of the diaphragm 216 to the strain-sensing elements 222.

In view of the above, one skilled in the art will appreciate that the sensor assemblies of this invention provide the operational advantages of a single-crystal silicon pressure sensor, yet further have the advantage of being sufficiently rugged, both physically and chemically, to be suitable for sensing a corrosive high-pressure medium. The sensitivity of the sensors can be tailored through appropriately altering the shape of the metal diaphragm, whose material can be specifically selected to be resistant to the corrosive medium being sensed. The result is a pressure sensor that is amenable to manufacturing methods that yield a relatively low cost pressure sensor capable of sensing very high pressures, e.g., up to at least 4000 atmospheres, while simultaneously achieving high reliability and high performance within a relatively small sensor package.

While our invention has been described in terms of a preferred embodiment, other forms could be adopted by one skilled in the art. For example, in addition to sensing pressure, the teachings of this invention are applicable to strain gauges for load cells, weight sensors and strain sensors. Accordingly, the scope of our invention is to be limited only by the following claims.

What is claimed is:

1. A sensing structure comprising:
    a metal body having a diaphragm, the metal body having an edge formed by an abrupt change in thickness of the metal body in a direction normal to the diaphragm, the edge defining a boundary of the diaphragm;
    a silicon chip secured to the metal diaphragm, the silicon chip comprising a strain-sensing element aligned with the edge of the body in the direction normal to the diaphragm, whereby movement of the diaphragm induces strain in the silicon chip that is concentrated at the strain-sensing element of the silicon chip; and
    the silicon chip having a surface facing the metal body, the silicon chip having a groove in the surface so as to be between the strain-sensing element and the metal body, the groove causing the strain induced in the silicon chip by movement of the diaphragm to be further concentrated at the strain-sensing element of the silicon chip.

2. A sensing structure as recited in claim 1, wherein the strain-sensing element is defined by at least one doped surface region of the silicon chip.

3. A sensing structure as recited in claim 1, wherein the strain-sensing element is defined by at least one thin-film piezoresistive element on the silicon chip.

4. A sensing structure as recited in claim 1, further comprising signal conditioning circuitry electrically interconnected with the strain-sensing element.

5. A sensing structure as recited in claim 1, wherein the metal body comprises a rim portion surrounding the diaphragm, the edge of the metal body being defined between the diaphragm and the rim portion.

6. A sensing structure as recited in claim 1, wherein the metal body comprises a boss centrally located on the diaphragm, the edge of the metal body being defined between the diaphragm and the boss.

7. A sensing structure as recited in claim 6, wherein the metal body comprises a rim portion surrounding the diaphragm, a second edge of the metal body being defined between the diaphragm and the rim portion, the silicon chip further comprising a second strain-sensing element aligned with the second edge of the body in the direction normal to the diaphragm.

8. A sensing structure comprising:
    a metal body having a diaphragm, the metal body having an edge formed by an abrupt change in thickness of the metal body in a direction normal to the diaphragm, the edge defining a boundary of the diaphragm;
    a silicon chip secured to the metal diaphragm, the silicon chip comprising a strain-sensing element aligned with the edge of the body in the direction normal to the diaphragm, whereby movement of the diaphragm induces strain in the silicon chip that is concentrated at the strain-sensing element of the silicon chip, the silicon chip having a surface facing the metal body, the silicon chip having a plurality of recesses in the surface.

9. A sensing structure as recited in claim 8, the silicon chip having a groove in the surface so as to be between the strain-sensing element and the metal body, the groove causing the strain induced in the silicon chip by movement of the diaphragm to be further concentrated at the strain-sensing element of the silicon chip.

10. A sensing structure as recited in claim 9, wherein the silicon chip is attached to the metal body with a bonding material, the bonding material extending at least partially into the plurality of recesses in the surface of the silicon chip.

11. A pressure sensor assembly comprising:
    a stainless steel body comprising a diaphragm, a rim surrounding the diaphragm, a boss centrally located on the diaphragm, a first edge formed by an abrupt change in thickness of the metal body in a direction normal to the diaphragm between the diaphragm and the rim, and a second edge formed by an abrupt change in thickness of the metal body in the direction normal to the diaphragm between the diaphragm and the boss;
    a single-crystal silicon chip secured to the metal diaphragm, the silicon chip comprising a plurality of piezoresistive strain-sensing elements, each of the strain-sensing elements being aligned over at least one of the first and second edges of the body in the direction normal to the diaphragm, whereby movement of the diaphragm induces strain in the silicon chip that is concentrated at the strain-sensing elements of the silicon chip.

12. A pressure sensor assembly as recited in claim 11, wherein at least one of the strain-sensing elements is defined by at least one doped surface region of the silicon chip.

13. A pressure sensor assembly as recited in claim 11, wherein at least one of the strain-sensing elements is defined by at least one thin-film piezoresistive element on the silicon chip.

14. A pressure sensor assembly as recited in claim 11, further comprising signal conditioning circuitry electrically interconnected with the strain-sensing elements.

15. A pressure sensor assembly as recited in claim 11, wherein at least one of the strain-sensing elements is aligned over the first edge of the metal body in the direction normal to the diaphragm.

16. A pressure sensor assembly as recited in claim 15, wherein at least one of the strain-sensing elements is aligned over the second edge of the metal body in the direction normal to the diaphragm.

17. A pressure sensor assembly as recited in claim 11, wherein all of the strain-sensing elements are aligned over the first and second edges of the metal body.

18. A pressure sensor assembly as recited in claim 11, the silicon chip having a surface facing the metal body, the silicon chip having a U-shaped groove in the surface so as to be between at least one of the strain-sensing elements and the metal body, the groove causing the strain induced in the silicon chip by movement of the diaphragm to be further concentrated at the at least one strain-sensing element of the silicon chip.

19. A pressure sensor assembly as recited in claim 11, the silicon chip having a surface facing the metal body, the silicon chip having a plurality of recesses in the surface.

20. A pressure sensor assembly as recited in claim 19, wherein the recesses are undercut in the surface of the silicon chip and wherein the silicon chip is attached to the metal body with a bonding material, the boding material extending at least partially into the plurality of recesses in the surface of the silicon chip.

* * * * *